United States Patent
Duncan et al.

(10) Patent No.: US 8,563,897 B2
(45) Date of Patent: Oct. 22, 2013

(54) SHEATHED WELDING WIRE

(75) Inventors: Daryl L. Duncan, Troy, OH (US);
Robert Rutherford, Telluride, CO (US)

(73) Assignee: Illinois Tool Works Inc., Glenview, IL (US)

( * ) Notice: Subject to any disclaimer, the term of this patent is extended or adjusted under 35 U.S.C. 154(b) by 1543 days.

(21) Appl. No.: 11/796,913

(22) Filed: Apr. 30, 2007

(65) Prior Publication Data

US 2008/0264924 A1  Oct. 30, 2008

(51) Int. Cl.
*B23K 35/34* (2006.01)

(52) U.S. Cl.
USPC ............... 219/146.41; 219/146.1; 219/12; 219/146.23; 219/146.52

(58) Field of Classification Search
USPC .............. 219/145.1, 145.22, 146.32
See application file for complete search history.

(56) References Cited

U.S. PATENT DOCUMENTS

| | | | |
|---|---|---|---|
| 3,424,892 A * | 1/1969 | Wilcox | 219/137 R |
| 3,495,069 A * | 2/1970 | Cavanagh et al. | 219/146.41 |
| 3,848,109 A | 11/1974 | Zvanut | |
| 6,042,782 A * | 3/2000 | Murata et al. | 420/109 |
| 2005/0205525 A1* | 9/2005 | Barhorst et al. | 219/74 |

FOREIGN PATENT DOCUMENTS

| | | |
|---|---|---|
| FR | 2513920 A | 4/1983 |
| GB | 1160156 A | 7/1969 |

OTHER PUBLICATIONS

Unknown, Gas Metal Arc Welding—Equipment, http://en.wikipedia.org/wiki/Gas_metal_arc_welding#Equipment.
Unknown, Stainless Steel—Types of stainless steel, http://en.wikipedia.org/wiki/Stainless_steel#Types_of_stainless_steel.
Unknown, AISI Steel Grades, http://en.wikipedia.org/wiki/AISI_steel_grades.
Unknown, Welding Wire, http://www.hobartwelders.com/weldit/filler_metals/weldwire.html.
Unknown, Ask the Experts, http://www.lincolnelectric.com/knowledge/articles/content/stainlesssteel.asp.
Unknown, Metal-Cored Wire is Suited for Robotic MIG Welding, http://news.thomasnet.com/fullstory/456519.
Unknown, MIG Welding Tips, Hobart.
Unknown, Guidelines to Gas Metal Arc Welding, Hobart.

* cited by examiner

*Primary Examiner* — Brian Jennison
(74) *Attorney, Agent, or Firm* — Fletcher Yoder, P.C.

(57) ABSTRACT

Provided is a welding wire and method for manufacturing a welding wire providing for quality welds on 300 series stainless steel and similar materials. A metal powder core is encapsulated in a metal sheath. The metal sheath composition comprising up to about 6% nickel, by weight, and may correspond to a series 400 stainless steel. A combination of the metal sheath and the metal powder core provides an overall alloy content of a series 300 stainless steel.

6 Claims, 3 Drawing Sheets

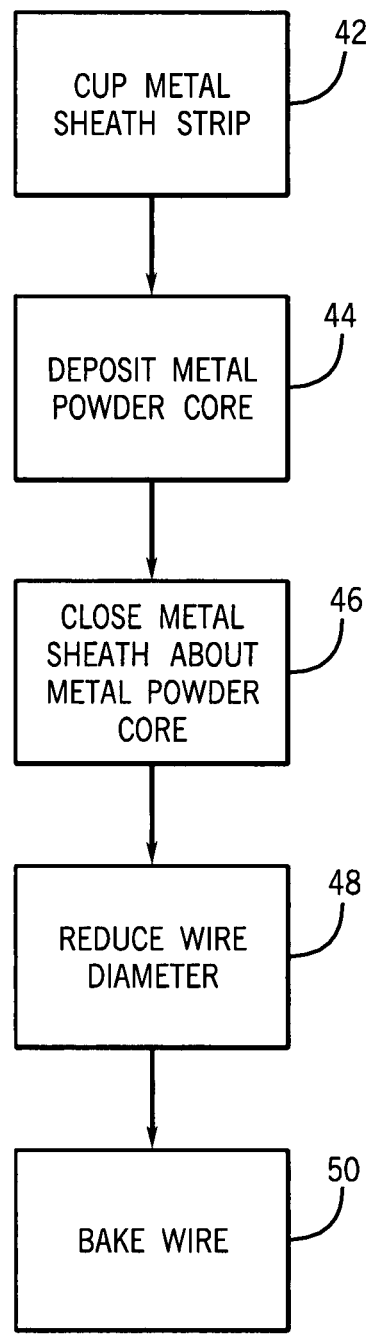

SHEATHED WELDING WIRE

BACKGROUND

The invention relates generally to the field of welding systems and more particularly to sheathed welding wires that improve welding performance.

Welding systems generally make use of electrodes configured to pass an arc between a torch and a work piece, thereby heating the work piece to create a weld, and in certain welding systems melting the electrode to add metal to the weld. A number of forms of welding are known and are generally used in the art. In many systems, such as metal inert gas (MIG) systems, the wire electrode is advanced through a welding torch and is generally consumed by the heat of the arc. In such operations, the wire electrode may also be known as a "filler material" that becomes part of the weld. The electrode may be provided in a variety of materials and forms, including solid wire electrodes and metal-core wire electrodes. Metal-core wire electrodes generally include tubular shaped metal sheath about their exterior and a metal powder core including various powdered materials.

The selection of the type of electrode for a particular welding operation may be based on several factors, including, the composition of the metals being welded, the joint design and the material surface conditions. In general, it is desirable that the weld electrode have mechanical properties similar to those of the base material and no discontinuities, such as porosity. Thus, desirable electrodes may include solid wire electrodes or metal-core wire electrodes that comprise similar compositions to a work piece when they are melted into the weld location. In other words, in a metal-core wire, the core of the wire and the sheath material surrounding the core may combine to define an overall composition when the wire is melted.

Further, the electrode may include properties that affect the quality of the weld. For example, an electrode may dictate the width of the arc, the heat of the weld, the depth of the weld, and the like. The electrode may also affect the ease of welding. For example, a given electrode may be susceptible to sticking of electrode to the work piece during welding and, thus, increase the difficulty of welding.

In addition, depending upon the particular metallurgy of the welding wire, aspects of the welding operation may be less than optimal. For example, certain applications may require specific wire metallurgy. One example is in the manufacture of vehicle exhaust systems, in which solid series 300 stainless steel welding wire is commonly used. However, due to energy density issues, diameter and wetting/viscosity, incidences of burn through can be high. Also, 300 series wire has a tendency to micro-arc or stick during current transfer from the welding torch contact tip to the wire. Such micro-arcing causes contact tip wear and failure, as well as burn back. Moreover, the wire may freeze momentarily, creating process stability problems.

Accordingly, there is need for a welding wire that is compatible with welding applications and that comprises properties that provide for a quality weld.

BRIEF DESCRIPTION

The invention provides a welding wire electrode designed to respond to such needs. In accordance with one aspect of the present invention, a welding wire comprises a metal core and a metal sheath encapsulating the core. The metal sheath comprises a ferritic steel. The combination of the metal sheath and the metal core comprises an overall alloy content of a 300 series stainless steel.

In accordance with another aspect of the present invention, a welding wire comprises a metal core and a metal sheath encapsulating the core. The metal sheath comprises between about 16 and about 18% of chromium by weight and up to about 0.75% of nickel by weight. An alloyed combination of the metal sheath composition and the metal core comprise comprises between about 23 and 25% of chromium by weight and between about 12 and 14% of nickel by weight.

A welding wire is also provided that has a series 400 stainless steel sheath, and a core that, in combination with the sheath, provides the wire with an overall composition of a series 300 stainless steel.

The present invention also provides a method of manufacturing a welding wire. A metal sheath comprising up to about 6% of nickel by weight is first cupped, and a metal core material is disposed on the metal sheath. The combination of the metal sheath and the core provides an overall alloy content of a 300 series stainless steel. The metal sheath is then closed about the metal core material to form a wire, which may then be reduced a diameter of the wire and baked.

DRAWINGS

These and other features, aspects, and advantages of the present invention will become better understood when the following detailed description is read with reference to the accompanying drawings in which like characters represent like parts throughout the drawings, wherein:

FIG. 4 is a flowchart illustrating a method to manufacture the welding wire of FIGS. 2 and 3 in accordance with one aspect of the present technique.

DETAILED DESCRIPTION

Figure 1:
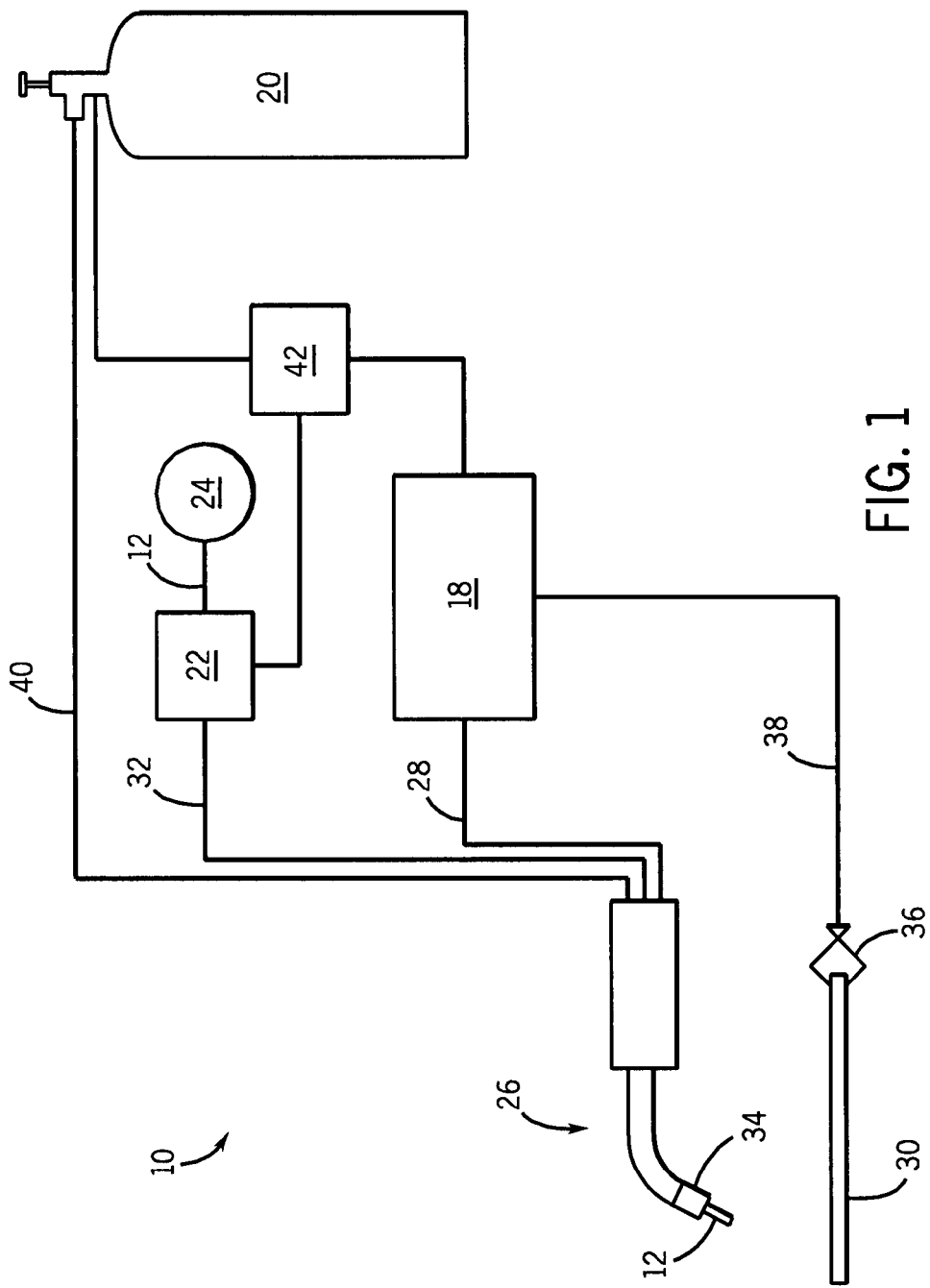
FIG. 1 illustrates an exemplary welding system in which the wire electrode of the present invention may be employed.

Referring now to FIG. 1, welding system 10 is illustrated that employs electrode 12 in accordance with one embodiment of the present technique. As discussed in greater detail below, the electrode 12 includes a metal-core welding wire that is comprised of an outer sheath material and a core material. For example, as described in greater detail below, the welding wire may include a metal sheath that encapsulates a metal core material. As will be discussed in greater detail below, in one embodiment, the metal sheath may comprise a ferritic steel and the metal core material may comprise alloying elements such that the combination of the metal sheath and the metal core material create a series 300 series stainless steel. In other words, when the electrode 12 is melted, the compositions of the metal sheath and the metal powder core combine to form a series 300 series stainless steel filler material that is deposited into the weld. As will be discussed below, embodiments of the electrode 12 may create better arc-stability, better contact tip life due to reduced micro-arcing, reduced burn-through and produce smoother welds.

As depicted, the MIG welding system 10 includes a power source 18, a shielding gas source 20, a wire feeder 22, electrode source 24 and a welding gun 26. In the illustrated embodiment, the power source 18 may supply power to the electrode 12 via a power conduit 28 and the welding gun 26. For example, a current may be provided to the electrode 12 within the welding gun 26. In such a welding system 10, an operator may control the location and operation of the electrode 12 by positioning the electrode 12 and triggering the starting and stopping of the current flow. In gas metal arc welding, the power source 18 typically will supply a constant voltage that helps to maintain a stable arc length as the distance from the electrode 12 to a work piece 30 is changed.

During a welding operation, wire feeder 22 advances wire electrode 12 from the electrode source 24. For example, as depicted, the electrode source 24 may include a spool that unwinds as the wire feeder 22 draws the wire electrode 12 and feeds it through the electrode conduit 32 and through the contact tip 34 of the welding gun 26. On the path to the contact tip 34, the electrode 12 may be protected by a liner that helps to prevent bucking and maintains an uninterrupted feed of wire. The electrode may be advanced through the gun when operator pulls a trigger on the welding gun 26 or provides another signal to advance the electrode.

The welding arc is created as current flows from the tip of the electrode 12 to the work piece 30 and returns to the power source 18. Therefore, the work piece 30 is generally grounded to the power source 18 to provide a return path. For example, as depicted, a work clamp 36 and cable 38 complete the electrical path between the work piece 30 and the power source 18.

Some forms of arc welding may include a shielding gas to protect the weld area from atmospheric gases such as nitrogen and oxygen. Left unprotected, these gases can cause fusion defects, porosity and weld metal embrittlement. As depicted in FIG. 1, the shielding gas may be provided to the gun 26 from a shielding gas source 20 via the gas supply conduit 40. In some applications, the gas is automatically supplied during the welding operation and automatically shut-off when the operation is interrupted. The flow of gas may be triggered by the same switch that initiates the feed of the wire electrode.

Further, the system 10 may include a control circuit 42 that coordinates functions of the system 10. For example, the control circuit 42 may be in communication with the power source 18, the wire feeder 22 and/or the shielding gas source 20 to coordinate the operation of components of the system 10. Thus, the current, wire speed and gas may all stop and start in conjunction during welding.

As mentioned previously, during welding the arc created between the electrode 12 and the work piece 30 melts the electrode 12 to provide a filler material to the weld location. In a typical application, the electrode 12 is continuously fed to the weld location and consumed during the welding process. Thus, the electrode 12 becomes part of the material used to create the weld, and the electrode materials may strongly influence the mechanical properties of the weld. Accordingly, it is generally desired that the composition of the electrode 12 be compatible with the composition of the work piece 30. For example, manufacturers of exhaust systems may use a solid wire made of series 309 stainless steel material on series 304 stainless steel manifolds, mufflers, and so forth.

Further, the electrode 12 may affect the ease of welding. For example, some electrodes may have a tendency to stick to the work piece 30 and, thus, create vibration during welding, or even interrupt the steady flow of wire to the torch. It has been found that 300 series stainless steel wires pose particular difficulties in welding, believed due to the presence of specific alloying materials in specific percent ranges at the surface of the wire. That is, the very composition of the 300 series stainless steel, desirable in the weld, renders the welding wire difficult to use. To accommodate such applications, the present technique provides an electrode wire specifically designed to offer a composite metallurgy but in a jacket or sheath that prevents or reduces the adverse effects of the 300 series stainless steel composition at the surface of the electrode wire.

Figure 2:
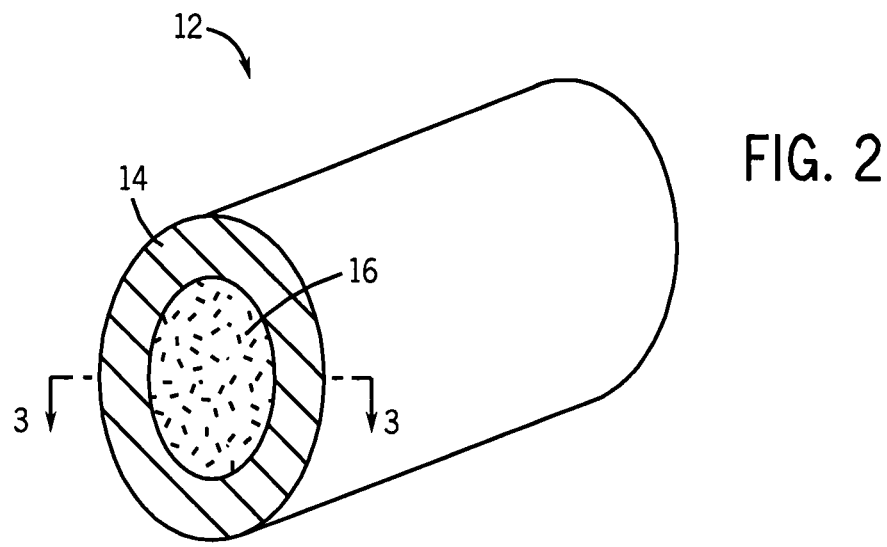
FIG. 2 illustrates an exemplary welding wire electrode of the system in FIG. 1 in accordance with aspects of the present technique.
Figure 3:
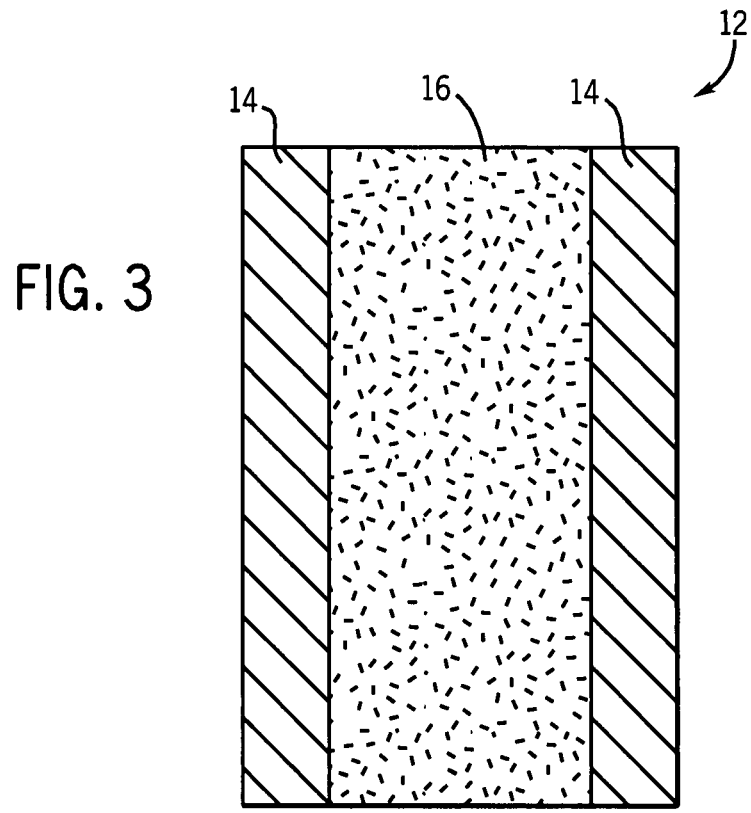
FIG. 3 illustrates a cross section taken across line 3-3 of the exemplary welding wire of FIG. 2 in accordance one aspects of the present technique.

As illustrated in FIGS. 2 and 3, in an embodiment of the present technique, an electrode 12 that has an overall composition of a series 300 stainless steel may include a ferritic steel metal sheath 14. The core of the electrode wire includes alloying materials that result, in combination with the ferritic steel sheath 14, in the overall composition meeting series 300 stainless steel specifications. Through use of the composite wire of the invention, an electrode 12 including a ferritic steel sheath has been shown to reduce or eliminate micro-arcing due to the absence or reduction of nickel in the ferritic steel metal sheath 14. In addition, the ferritic stainless steel metal sheath 14 may improve wetting of the weld location and, thus, reduces the angle of the weld pool bead to the work piece 30. The reduced angle is believed to reduce burn through and create better gap filling. Further, the BCC crystal structure of ferritic steels may provide desirable electrical properties.

Ferritic stainless steels are highly corrosion resistant. They contain between 10.5% and 27% chromium and very little nickel. Most compositions include molybdenum, aluminum or titanium. A ferritic stainless steel may include type 400 series stainless steels. Accordingly, the composition of the metal sheath 14 may include various 400 series stainless steels configured to accommodate numerous applications. In one embodiment, the metal sheath 14 may comprise a nickel content that is below about 6% by weight. For example, the metal sheath 14 may comprise a series 430 stainless steel (UNS S43000) that comprises between about 16 and 18% chromium, up to about 0.12% carbon, up to about 1% manganese, up to about 1% silicon, up to about 0.04% phosphorus, up to about 0.03% sulfur, and up to about 0.75% nickel, all percentages being by weight.

The metal sheath 14 may also be formed from other series 400 stainless steel metals. For example, the metal sheath may be formed from series 409, or series 439 stainless steel. The series 409 stainless steel (UNS S40900) may comprise between about 10.5% and 11.75% chromium, up to about 0.08% carbon, up to about 1% manganese, up to about 1% silicon, up to about 0.045% phosphorus, up to about 0.03% sulfur, and up to about 0.5% nickel, all percentages again being by weight. The series 439 stainless steel (UNS S43035) may comprise between about 17% and 19% chromium, up to about 0.07% carbon, and up to about 0.5% nickel, for example.

The present technique relies upon combining a series 400 stainless steel sheath 14 with a powder core 16 to provide an overall composition of a series 300 stainless steel. For example, the metal powder core 16 may comprise a core composition, as well as number of alloying elements to produce an electrode with an overall composition of a 300 series stainless steel when the electrode 12 is melted. Generally, the material of the metal powder core 16 may comprise iron. Additional alloying elements may include chromium, nickel, carbon, molybdenum, manganese, silicon, phosphorous, sulfur, copper and the like. The relative amounts of iron and alloying elements may be varied, along with the composition of the sheath 14 to provide an overall composition of the welding wire electrode 12. For example, as more of one element is added to the metal sheath 14, the amount of the elements in the metal powder core 16 may be reduced. The metal powder core 16 is not limited to materials in powder form, but may include any form of material that provides the desired overall composition.

As a general characteristic, a series 300 overall composition may include between about 6% and 40% nickel and between about 10% and about 35% chromium. In one embodiment, the overall composition may meet the specifications of a series 309 stainless steel. The series 309 stainless steel (UNS S30980) may comprise between about 23% and 25% chromium, up to about 0.12% carbon, up to about 0.75% molybdenum, between about 1% and 2.5% manganese, between about 0.3% and 0.65% silicon, up to about 0.03% phosphorus, about 0.03% sulfur, up to 0.75% copper, and between about 12% and 14% nickel, all by weight.

In other embodiments, the overall composition of the electrode 12 may include other series 300 stainless steels. For example, embodiments may include overall compositions of series 309LSi, 308, 316 or 317 stainless steels. The series 309LSi stainless steel (UNS S30988) may comprise between about 23% and about 25% chromium, up to about 0.03% carbon, up to about 0.75% molybdenum, between about 1% and 2.5% manganese, between about 0.65% and 1% silicon, up to about 0.03% phosphorus, about 0.03% sulfur, up to 0.75% copper, and between about 12% and 14% nickel, all by weight.

In an embodiment of a series 308 stainless steel (UNS S30800) the overall composition may comprise between about 19% and about 21% chromium, up to about 0.08% carbon, up to about 2% manganese, up to about 1% silicon, up to about 0.045% phosphorus, about 0.03% sulfur, and between about 10% and 12% nickel, all by weight.

In an embodiment of a series 316 stainless steel (UNS S31600) the overall composition may comprise between about 16% and about 18% chromium, up to about 0.08% carbon, between about 2% and 3% molybdenum, up to about 2% manganese, up to about 0.75% silicon, up to about 0.045% phosphorus, about 0.03% sulfur, up to about 0.1% nitrogen, and between about 10% and 14% nickel, all by weight.

In an embodiment of a series 317 stainless steel (UNS S31700) the overall composition may comprise between about 18% and about 20% chromium (Cr), up to about 0.08% carbon, between about 3% and 4% molybdenum, up to about 2% manganese, up to about 0.75% silicon, up to about 0.045% phosphorus, about 0.03% sulfur, up to about 0.1% nitrogen, and between about 11% and 15% nickel, all by weight.

Further, various methods may be employed to manufacture a metal core wire electrode 12 comprising a ferritic steel sheath 14 and an overall composition of a series 300 stainless steel. For example, a method for manufacturing a metal core wire is depicted in FIG. 4. A step in producing the metal-core wire electrode 12 may include cupping a metal sheath strip as shown at block 42. In one embodiment, a continuous strip of metal sheath material may be provided and manipulated to form a cup-shaped trough. For example, an embodiment may include providing a generally continuous flat strip of series 400 metal and rolling the edges of the strip to form a trough shaped strip of metal sheath material.

Next, the method may include a step of depositing the metal powder core as depicted at block 44. An embodiment may include a device depositing a composition of the metal powder core 16 into the trough of the cupped-shaped strip of the metal sheath material. For example, as a generally continuous length of the cupped metal sheath 12 passes a deposition station, a mechanism may deposit a continuous stream of the metal powder core 16, including iron and other alloying elements, into the progressively cupped trough. Thus, the metal core composition will rest within the trough of the metal sheath material as the sheath is progressively closed around it.

With a bead of metal powder core 16 deposited along the length of the cupped metal sheath 12, the metal sheath 12 may be closed to encapsulate the metal powder core 16, as summarized at block 46. In one embodiment, the length of metal sheath 12 with the deposited metal powder core 16 may be advanced through one or more progressive rolling stations that roll the cupped metal sheath 14 into a tubular enclosure about the metal powder core 16. As the metal sheath 12 is rolled about the powder core, the pressure of the rolling may form a seam along the length of the sheath 14. Thus, a substantially round wire is formed including the metal sheath 14 about the powder metal core 16.

Subsequent to closing the metal sheath about the metal powder core (block 46), the diameter of the wire electrode 12 may be manipulated (e.g., reduced) to a desired dimensions, as depicted at block 48. In one embodiment, the closed metal sheath 14 and core 16 may be advanced through an additional rolling station configured to reduce the diameter to provide an appropriate round wire shape. A moderate size wire may include about 0.0625 inches in outer diameter, and a small wire may include a diameter of about 0.035 to 0.045 inches. In one embodiment, a larger wire may comprise a diameter of about 0.0983 inches. It is also worth noting that the rolling technique may also complete the seam formed at the edges of the metal sheath 14.

Finally, the wire may be baked, as depicted at block 50. Baking the wire may remove moisture from the wire and consolidate the core materials. For example, the reduced diameter wire may be baked at 600° F.-700° F. to promote the removal of moisture through the seam of the metal sheath 14. In one embodiment, the wire electrode 12 may be continuously advanced through an oven during the manufacture process to provide even heating across the wire electrode 12.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire, comprising:
   a metal sheath comprising between about 16 and 18% chromium and up to about 0.75% nickel, all by weight; and
   a core encapsulated by the sheath, an alloyed combination of the metal sheath and the core comprising between about 23 and 25% chromium and between about 12 and 14% nickel, all by weight.

2. The welding wire of claim 1, the core composition comprising iron.

3. The welding wire of claim 1, the alloyed combination comprising between about 0.65 and 1% silicon, by weight.

4. The welding wire of claim 1, comprising an outer diameter equal to or less than approximately 0.0625 inches.

5. The welding wire of claim 1, comprising an outer diameter of between approximately 0.035 inches and 0.045 inches.

6. The welding wire of claim 1, wherein the metal sheath comprises a series 439 stainless steel comprising between about 17% Wt and 19% Wt Cr and up to about 0.5% Wt Ni.

* * * * *